United States Patent Office 3,632,599
Patented Jan. 4, 1972

3,632,599
SUBSTITUTED 1,2,4-OXADIAZOLIDINE-3,5-DIONES
Albrecht Zschocke, Bad Durkheim, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Apr. 24, 1968, Ser. No. 723,919
Claims priority, application Germany, Apr. 28, 1967, P 16 95 502.5; Jan. 31, 1968, P 16 70 312.1
Int. Cl. C07d 85/52
U.S. Cl. 260—307
2 Claims

ABSTRACT OF THE DISCLOSURE

Substituted 1,2,4 - oxadiazolidine - 3,5 - diones and a method of controlling unwanted plants with said compounds without injuring the crop plants.

---

The present invention relates to new substituted 1,2,4-oxadiazolidine-3,5-diones and a method of controlling unwanted plants with said compounds.

It is known that 2-chloro-4,6-bis(ethylamino)-s-triazine may be used as a herbicide. However its action is not satisfactory and furthermore it injures certain crops, e.g. rice.

An object of the present invention is to provide valuable new substituted 1,2,4-oxadiazolidine-3,5-diones, in particular those containing a phenyl radical in the 2-position. Another object of the invention is to provide a method of controlling unwanted plants with substituted 1,2,4-oxadiazolidine-3,5-diones without injuring the crop plants.

These and other objects of the invention are achieved with substituted 1,2,4-oxadiazolidine - 3,5-diones having the formula

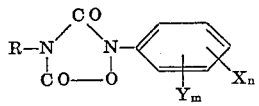

in which

R denotes a lower aliphatic radical which may be substituted by chlorine or bromine, or a benzyl, cyclohexyl or phenyl radical which may be substituted by halogen or methyl,
Y denotes halogen or a trifluoromethyl, nitro, lower alkyl, lower alkoxy, lower alkylamino, lower dialkylamino, acetylamino, lower alkylthio, alkylsulfoxide, alkylsulfonyl, cyano or thiocyano group,
n denotes 0 to 2,
m denotes 0 to 3,
n+m being at most 3, and
X denotes the substituents
—SO₂OH and the salts of these compounds
—SO₂OR (R=alkyl)

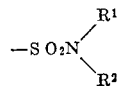

(R¹ and R² are identical or different and denote H or an alkyl radical)
—OH

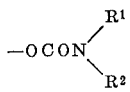

(R¹ and R² are identical or different and denote H or an aliphatic, cycloaliphatic, araliphatic or aromatic radical)
—OCOR (R=alkyl)

—OCH₂COOH and the salts of these compounds

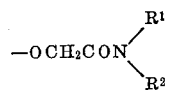

(R¹ and R² are identical or different and denote H or an alkyl radical)
—OCH₂COOR (R=alkyl)
—COOH and the salts of these compounds

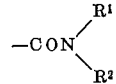

(R¹ and R² are identical or different and denote H or an alkyl radical)
COOR (R=alkyl)
COSR (R=alkyl)

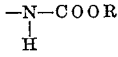

(R=aliphatic radical)

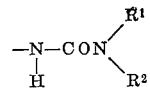

(R¹ and R² are identical or different and denote H or an alkyl radical)

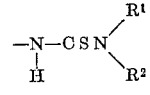

(R¹ and R² are identical or different and denote H or an alkyl radical)

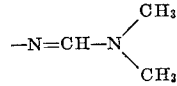

—N=C=S

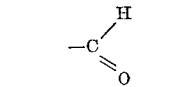

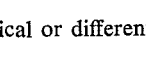

(R¹ and R² are identical or different and denote H or an alkyl radical)
—COR (R=alkyl)
—SH and the salts of these compounds

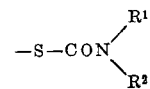

R¹ and R² are identical or different and denote hydrogen or an alkyl radical)
—S—COR (R=alkyl)
hydroxyalkyl
cyanoalkyl
—CH₂COOH and the salts of these compounds.

By salts we mean principally alkali metal (sodium and potassium) salts and alkaline earth metal (magnesium and calcium) salts.

The compounds according to the invention may be simply prepared from substituted N-phenyl-N-hydroxyureas and chlorocarbonic esters or phosgene; the N-phenyl-N-hydroxyureas may be prepared for example from the appropriate isocyanates and substituted phenylhydroxylamines. An alternative route for the preparation of the compounds according to the invention is the reaction of substituted phenylhydroxylamines and N-alkyl-N-chloroformyl carbamates. The phenylhydroxylamines used as the starting material are prepared in conventional manner, for example by reducing the appropriate nitrobenzene with zinc dust. The N-alkyl-N-chloroformyl carbamates are obtained in conventional manner by reacting N-alkyl carbamates with phosgene.

The X and Y radicals may be present as substituents of the phenyl nucleus before the nitrobenzene is reduced; however they may also be introduced after cyclization to the 1,2,4-oxadiazolidine-3,5-dione by further reaction at a hydroxy, mercapto, amino, carboxy, formyl or sulfonyl, group in the ring compound.

The following experimental data illustrate the preparation of the compounds according to the invention. Parts specified in the examples are parts by weight.

EXAMPLE 1

41.7 parts of 3-nitrophenol and 6.5 parts of ammonium chloride are suspended or dissolved in 75 parts of water and 150 parts of ethanol, and 52 parts of zinc dust is introduced into the mixture in portions while stirring well at a temperature of 70° to 80° C. in a nitrogen atmosphere. The whole is then filtered and the residue is washed with 150 parts of alcohol. The filtrate is reacted with 45.5 parts of methyl N-methyl-N-chloroformyl carbamate while being stirred well in a nitrogen atmosphere at a temperature of 20° to 30° C. The precipitate is suction filtered, washed with alcohol and dried. 52 parts of 2 - (3 - hydroxyphenyl) - 4 - methyl - 1,2,4 - oxadiazolidine-3,5-dione is obtained with a melting point of 175° C.

EXAMPLE 2

10.4 parts of 2-(3-hydroxyphenyl)-4-methyl-1,2,4-oxadiazolidine-3,5-dione is suspended in 50 parts of acetone, to which 3 drops of triethylamine have been added, and the whole is reacted with 3 parts of methyl isocyanate. On gentle heating all the crystals dissolve. Some time later a new precipitate forms which is suction filtered and dried. 10.5 parts of 2-(3-methylcarbamoyloxyphenyl)-4-methyl-1,2,4-oxadiazolidine-3,5-dione is obtained with a melting point of 126° C.

EXAMPLE 3

69.5 parts of 3-nitrophenol is dissolved in 200 parts of toluene and 60 parts of triethylamine and the mixture is reacted with 58 parts of dimethylcarbamyl chloride. The whole is kept at 70° C. for several hours. After cooling, 50 parts of water is added, the whole is stirred for 30 minutes at room temperature, the aqueous layer is separated and the organic layer is washed with water several times. The oily residue which remains after drying and concentration becomes solid on standing. 66 parts of 3-dimethylcarbamoyloxynitrobenzene is obtained with a melting point of 65° to 67° C.

EXAMPLE 4

31.5 parts of dimethylcarbamoyloxynitrobenzene and 3.25 parts of ammonium chloride are suspended or dissolved in 37.5 parts of water and 75 parts of ethanol, and 26 parts of zinc dust is added in portions while stirring well at 70° to 80° C. in a nitrogen atmosphere. The mixture is then filtered and the residue washed with 75 parts of alcohol. The filtrate is reacted with 22.75 parts of methyl N-methyl-N-chloroformyl carbamate while being stirred well in a nitrogen atmosphere at 20° to 30° C. The precipitated oil is extracted with methylene chloride. The solvent is evaporated and the residue is recrystallized from isopropanol. 27.5 parts of 2-(3-dimethylcarbamoyloxyphenyl) - 4 - methyl - 1,2,4 - oxadiazolidine-3,5-dione is obtained with a melting point of 80° C.

EXAMPLE 5

11.75 parts of N-3,4-dichlorophenyl-N-hydroxy-N'-methylurea is suspended in 75 parts of ethyl alcohol and 50 parts of water and mixed, while stirring well at 16° to 22° C., with 2.4 parts of sodium hydroxide which has been dissolved in 10 parts of water. 6.5 parts of ethyl chloroformate is dripped at 16° to 22° C. into the solution thus obtained. The reaction mixture is then stirred for several hours at 40° C. The precipitate which forms is suction filtered, washed with water and dried. 11 parts of 2 - (3',4' - dichlorophenyl) - 4 - methyl - 1,2,4 - oxadiazolidine-3,5-dione is obtained with a melting point of 122° to 124° C.

The following substances are examples of compounds according to the present invention:

| X | Y | n | m | R | M.P., ° C |
|---|---|---|---|---|---|
| 3-OH | | 1 | 0 | —CH$_3$ | 175 |
| 3-OCONHCH$_3$ | | 1 | 0 | —CH$_3$ | 126 |
| 3-OCON(CH$_3$)$_2$ | | 1 | 0 | —CH$_3$ | 80 |
| 3-OCONHC$_2$H$_5$ | | 1 | 0 | —CH$_3$ | 111 |
| 3-OCONH—CH(CH$_3$)$_2$ | | 1 | 0 | —CH$_3$ | 125 |
| 3-OCONHC$_4$H$_9$ | | 1 | 0 | —CH$_3$ | 110 |
| 3-OCONH—C$_6$H$_4$—CH$_3$ | | 1 | 0 | —CH$_3$ | 121 |
| 3-OCONHCH$_2$—C$_6$H$_5$ | | 1 | 0 | —CH$_3$ | 124 |
| 3-OCONH—C$_6$H$_5$ | | 1 | 0 | —CH$_3$ | 139 |

| X | Y | n | m | R | M.P., °C. |
|---|---|---|---|---|---|
| 3-OCOCH(CH₃)(CH₃) | --- | 1 | 0 | —CH₃ | 62 |
| 3-CHO | --- | 1 | 0 | —CH₃ | 103 |
| 4-CHO | --- | 1 | 0 | —CH₃ | 107 |
| 2-SO₂NH₂ | --- | 1 | 0 | —CH₃ | 170 |
| 3-SO₂NH₂ | --- | 1 | 0 | —CH₃ | 150 |
| 4-SO₂NH₂ | --- | 1 | 0 | —CH₃ | 130 |
| 3-COCH₃ | --- | 1 | 0 | —CH₃ | 60 |
| 3-COOH | --- | 1 | 0 | —CH₃ | 203 |
| 4-COOH | --- | 1 | 0 | —CH₃ | 237 |
| 3-OH | 4—Cl | 1 | 1 | —CH₃ | 166 |
| 3-OH | 4—CH₃ | 1 | 1 | —CH₃ | |
| 3-OCONHCH₃ | 4—Cl | 1 | 1 | —CH₃ | 155 |

| Y₁ | Y₂ | m | n | R | M.P., °C. |
|---|---|---|---|---|---|
| 4-Cl | --- | 1 | 0 | CH₃ | 116-118 |
| 3-Cl | 4—Cl | 2 | 0 | CH₃ | 124 |
| 3-Cl | --- | 1 | 0 | CH₃ | 77-78 |
| 3-Cl | --- | 0 | 0 | CH₃ | 96 |
| 4-Cl | --- | 1 | 0 | —CH(CH₃)₂ | 55-56 |
| 3-Cl | 4—Cl | 2 | 0 | —CH(CH₃)₂ | 90 |
| 3-Cl | --- | 0 | 0 | —CH(CH₃)₂ | 60-62 |
| 3-Cl | --- | 1 | 0 | —CH(CH₃)₂ | 44-45 |
| 3-Cl | --- | 0 | 0 | —C₆H₄—Cl | 139-141 |
| 3-Cl | --- | 0 | 0 | —CH₂—C₆H₅ | 114-115 |
| 3-Cl | --- | 0 | 0 | —C₆H₁₁ | 90-91 |
| 4-Cl | --- | 1 | 0 | —CH₂—CH₂—Cl | 90 |
| 3-CH₃ | 4—Cl | 2 | 0 | CH₃ | 93 |
| 3-CF₃ | --- | 1 | 0 | —CH₃ | 117-119 |
| 3-Cl | 4-CH₃ | 2 | 0 | —CH(CH₃)₂ | 66 |
| 4-Br | --- | 1 | 0 | —CH₃ | 122 |
| 4-Br | --- | 1 | 0 | —CH(CH₃)₂ | 65 |
| 2-CH₃ | 5-Cl | 2 | 0 | —CH₃ | 97 |
| 2-Cl | 5-Cl | 2 | 0 | —CH₃ | 101 |
| 2-Cl | --- | 1 | 0 | —CH₃ | 116 |
| 4-CH₃ | --- | 1 | 0 | —CH₃ | 99 |
| 2-CH₃ | 3-Cl | 2 | 0 | —CH₃ | 106 |
| 3-CH₃ | --- | 1 | 0 | —CH₃ | 82 |
| 2-Cl | 4-Cl | 2 | 0 | —CH₃ | 82 |
| 2-Cl | 4-Cl, Y₃=5-Cl | 3 | 0 | —CH₃ | 113 |
| 3-Cl | 4-Cl | 2 | 0 | —CH₂CH₂Cl | 68-70 |

The compounds according to this invention may be used as agents for regulating plant growth in the form of solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The compounds may also be applied in granulated form.

Water-soluble salts may also be applied in the form of their aqueous solutions.

Insecticides, fungicides, bactericides and other herbicides may be added to the compounds or the latter may be mixed with fertilizers.

Dusts may be prepared by mixing or grinding the active ingredients with a solid carrier.

The following examples illustrate the application of the compounds according to the invention.

EXAMPLE 6

In a greenhouse the plants barley (*Hordeum vulgare*), wheat (*Triticum sativum*), rice (*Oryza sativa*), wild mustard (*Sinapis arvensis*), small nettle (*Urtica urens*), common chickweed (*Stellaria media*), chamomile (*Matricaria chamomilla*), white goosefoot (*Chenopodium album*), annual meadow grass (*Poa annua*), slender foxtail (*Alopecurus myosuroides*) and barnyard grass (*Panicum crus galli*) were treated at a growth height of 2 to 17 cm. with 2-(3 - dimethylcarbamoyloxyphenyl) - 4 - methyl-1,2,4-oxadiazolidine-3,5-dione (I) and, for comparison, with 4,6-dinitro-2-s-butylphenyl acetate (II) at a rate of 1.5 kg. of active ingredient per hectare dispersed with sodium lignin sulfonate in 500 liters of water.

The following results were observed after 3 to 4 weeks:

|  | Active ingredient | |
|---|---|---|
|  | I | II |
| Wheat | 0-10 | 0-10 |
| Barley | 0-10 | 10 |
| Rice | 10 | 20-30 |
| Wild mustard | 90-100 | 90 |
| Small nettle | 90-100 | 90 |
| Common chickweed | 90-100 | 80-90 |
| Chamomile | 90 | 80 |
| White goosefoot | 90-100 | 90 |
| Annual meadow grass | 80-90 | 0 |
| Slender foxtail | 80-90 | 10 |
| Barnyard grass | 80 | 10-20 |

NOTE.—0=No action; 100=complete kill.

EXAMPLE 7

Pots with a diameter of 8 cm. were filled with loamy sandy soil and sown with seeds of Indian corn (*Zea mays*), barley (*Hordeum vulgare*), wheat (*Triticum sativum*), rice (*Ozyza sativa*), cotton (*Gossypium sp.*) and the broadleaved and grass weeds white goosefoot (*Chenopodium album*), small nettle (*Urtica urens*), wild mustard (*Sinapis arvensis*), common chickweed (*Stellaria media*), chamomile (*Matricaria chamomilla*), annual meadow grass (*Poa annua*) and barnyard grass (*Panicum crus galli*). The soil was then treated with 2-(3-dimethylcarbamoyloxyphenyl)-4-methyl - 1,2,4 - oxadiazolidine-3,5-dione (I) at a rate of 2 to 3 kg. of active ingredient per hectare dispersed with sodium lignin sulfonate in 500 liters of water.

After 4 weeks it was observed that the broadleaved and grass weeds had almost completely withered, whereas the Indian corn, barley, wheat, rice and cotton were uninjured, and continued to grow normally.

The following substances have the same biological action as active ingredient I in Example 6 and 7:

2-(3-methylcarbamoyloxyphenyl)-4-methyl-1,2,4-oxadiazolidine-3,5-dione 2-(3-isopropylcarbamoyloxyphenyl)-4-methyl-1,2,4-oxadiazolidine-3,5-dione 2-(3-dimethylcarbamoyloxy-4-chlorophenyl)-4-methyl-1,2,4-oxadiazolidine-3,5-dione 2-(3-sulfonyl-4-chlorophenyl)-4-methyl-1,2,4-oxadiazolidine-3,5-dione 2-(3-carboxy-4-chlorophenyl)-4-methyl-1,2,4-oxadiazolidine-3,5-dione 2-(3-carbomethoxyaminophenyl)-4-methyl-1,2,4-oxadiazolidine-3,5-dione 2-(3-dimethylcarbamoylaminophenyl)-4-methyl-1,2,4-oxadiazolidine-3,5-dione

EXAMPLE 8

In a greenhouse pots with a diameter of 8 cm. were filled with loamy sandy soil and sown with seeds of wheat (*Triticum sativum*), barley (*Hordeum vulgare*), Indian corn (*Zea mays*), cotton (Gossypium sp.), white goosefoot (*Chenopodium album*), small nettle (*Urtica urens*), wild mustard (*Sinapis arvensis*), common chickweed (*Stellaria media*) and annual meadow grass (*Poa annua*). The soil prepared in this way was treated with 2-(3',4'-dichlorophenyl) - 4 - methyl - 1,2,4 - oxadiazolidine-3,5-dione (I), and, for comparison, with 2-chloro-4,6-bis-(ethylamino)-s-triazine (II), each at a rate of 1.5 kg. of active ingredient per hectare dispersed in 600 liters of water. After 3 to 4 weeks it was observed that in the case of I the plants white goosefoot, small nettle, wild mustard, common chickweed and annual meadow grass had almost completely withered and the crop plants wheat, barley and cotton were uninjured and continued to grow normally, where as II had a somewhat weaker herbicidal action and caused light to fairly serious damage to the barley, wheat and cotton.

EXAMPLE 9

The plants Indian corn (*Zea mays*), barley (*Hordeum vulgare*), wheat (*Triticum sativum*), rice (*Oryza sativa*), wild mustard (*Sinapis arvensis*), small nettle (*Urtica urens*), common chickweed (*Stellaria media*), cleavers (*Galium aparine*), vetch (Vicia sp.), chamomile (*Matricaria chamomilla*), white goosefoot (*Chenopodium album*), annual meadow grass (*Poa annua*), slender foxtail (*Alopecurus myosuroides*) and barnyard grass (*Panicum crus galli*) were treated at a growth height of 2 to 18 cm. with 2-(3',4'-dichlorophenyl)-4-methyl-1,2,4-oxadiazolidine-3,5-dione (I) and, for comparison, with 2-chloro-4,6-bis(ethylamino)-s-triazine (II), each at a rate of 1.5 kg. of active ingredient per hectare dispersed in 600 liters of water. After 8 to 10 days it could be observed that I had a stronger action than II and after 3 to 4 weeks the results shown in the table below were obtained:

|  | Active ingredient | |
|---|---|---|
|  | I | II |
| Crop plants: |  |  |
| Indian corn | 0 | 0 |
| Barley | 0-10 | 30 |
| Wheat | 0-10 | 20-30 |
| Rice | 10 | 20-30 |
| Unwanted plants: |  |  |
| Wild mustard | 90-100 | 90-100 |
| Small nettle | 100 | 100 |
| Common chickweed | 90-100 | 90-100 |
| Cleavers | 90-100 | 60 |
| Vetch | 70-80 | 60-70 |
| Chamomile | 90-100 | 80-90 |
| White goosefoot | 100 | 90-100 |
| Annual meadow grass | 90-100 | 90-100 |
| Slender foxtail | 90 | 80 |
| Barnyard grass | 80 | 40 |

NOTE.—0=No action; 100=complete kill.

EXAMPLE 10

An experimental plot was sown with wild mustard (*Sinapis arvensis*), small nettle (*Urtica urens*), common chickweed (*Stellaria media*), cleavers (*Galium aparine*), vetch (Vicia sp.), chamomile (*Matricaria chamomilla*), white goosefoot (*Chenopodium album*), annual meadow grass (*Poa annua*), slender foxtail (*Alopecurus myosuroides*) and barnyard grass (*Panicum crus galli*), and treated on the same day with 2-(3',4'-dichlorophenyl)-4-methyl-1,2,4-oxadiazolidine-3,5-dione. The rate of application was 5 kg. of active ingredient per hectare dispersed in 500 liters of water. After 4 to 5 weeks almost all the plants had completely withered.

EXAMPLE 11

A cultivated plot which was overgrown with wild mustard (*Sinapis arvensis*), small nettle (*Urtica urens*), common chickweed (*Stellaria media*), cleavers (*Galium aparine*), vetch (Vicia sp.), chamomile (*Matricaria chamomilla*), white goosefoot (*Chenopodium album*), annual meadow grass (*Poa annua*), slender foxtail (*Alopecurus myosuroides*) and barnyard grass (*Panicum crus*

*galli*) was sprayed with 2-(3′,4′-dichlorophenyl)-4-methyl-1,2,4-oxadiazolidine-3,5-dione (I) and, for comparison, with 2-chloro-4,6-bis-(ethylamino)-s-triazine (II). At the time of spraying the plants had a growth height of 3 to 8 cm. The rates of application were 5 kg. of active ingredient per hectare dispersed in 500 liters of water. It could be observed after a few days that the broadleaved and grass weeds treated with I exhibited a stronger herbicidal action than those treated with II. After 4 weeks almost all the plants had completely withered.

The following compounds have the same biological action as compound I in Examples 8 to 11:

2-(4′-chlorophenyl)-4-methyl-1,2,4-oxadiazolidine-3,5-dione
2-(3′-chlorophenyl)-4-methyl-1,2,4-oxadiazolidine-3,5-dione
2-phenyl-4-methyl-1,2,4-oxadiazolidine-3,5-dione
2-phenyl-4-isopropyl-1,2,4-oxadiazolidine-3,5-dione
2-(4′-bromophenyl)-4-methyl-1,2,4-oxadiazolidine-3,5-dione
2-(3′,4′-dibromophenyl)-4-methyl-1,2,4-oxadiazolidine-3,5-dione
2-(3′,4′-dichlorophenyl)-4-phenyl-1,2,4-oxadiazolidine-3,5-dione
2-(3′-trifluoromethylphenyl)-4-isopropyl-1,2,4-oxadiazolidine-3,5-dione
2-(4′-butoxyphenyl)-4-methyl-1,2,4-oxadiazolidine-3,5-dione
2-(4′-t-butylphenyl)-4-methyl-1,2,4-oxadiazolidine-3,5-dione
2-(3′-nitrophenyl)-4-methyl-1,2,4-oxadiazolidine-3,5-dione.

We claim:
1. A substituted 1,2,4-oxadiazolidine-3,5-dione having the formula

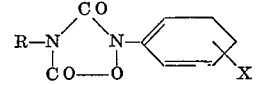

in which R is methyl or isopropyl and X is a substituent having the formula

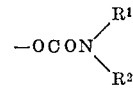

wherein $R^1$ is hydrogen, alkyl of 1 to 4 carbon atoms, cyclohexyl, benzyl or tolyl and $R^2$ is hydrogen or is either hydrogen or methyl where $R^1$ is alkyl.

2. 2-(3-dimethylcarbamoyloxyphenyl) - 4 - methyl-1,2,4-oxadiazolidine-3,5-dione.

References Cited

UNITED STATES PATENTS 3,437,664  4/1969  Krenzer _____ 260—307

OTHER REFERENCES

Zinner: C.A. 63, 600c (1965).
Zinner et al.: C.A. 64, 11201–2 (1966).
Baskakov et al.: C.A. 69, 96735s (1968).

ALEX MAZEL, Primary Examiner

R. V. RUSH, Assistant Examiner

U.S. Cl. X.R.

71—92

PO-1050
(5/69)

UNITED STATES PATENT OFFICE
CERTIFICATE OF CORRECTION

Patent No. 3,632,599     Dated January 4, 1972

Inventor(s) Albrecht Zschocke and Adolf Fischer

It is certified that error appears in the above-identified patent and that said Letters Patent are hereby corrected as shown below:

Column 1, line 4, "Durkheim" should read -- Duerkheim --.

Column 7, line 62, insert -- 2-(3-methylcarbamoyloxy-4-chlorophenyl)-4-methyl-1,2,4-oxadiazolidine-3,5-dione --.

Signed and sealed this 6th day of June 1972.

(SEAL)
Attest:

EDWARD M. FLETCHER, JR.
Attesting Officer

ROBERT GOTTSCHALK
Commissioner of Patents